US012589704B2

(12) United States Patent
Park et al.

(10) Patent No.:  US 12,589,704 B2
(45) Date of Patent:  Mar. 31, 2026

(54) REAR VEHICLE BODY STRUCTURE

(71) Applicants:HYUNDAI MOTOR COMPANY,
Seoul (KR); KIA CORPORATION,
Seoul (KR)

(72) Inventors: Taeou Park, Seoul (KR); **Sung Hoon
Cho, Bucheon-si (KR); Heedae Oh,**
Suwon-si (KR)

(73) Assignees: HYUNDAI MOTOR COMPANY,
Seoul (KR); KIA CORPORATION,
Seoul (KR)

( * ) Notice: Subject to any disclaimer, the term of this
patent is extended or adjusted under 35
U.S.C. 154(b) by 380 days.

(21) Appl. No.: 18/197,315

(22) Filed: May 15, 2023

(65) Prior Publication Data

US 2024/0059232 A1      Feb. 22, 2024

(30) Foreign Application Priority Data

Aug. 16, 2022    (KR) ........................ 10-2022-0101956

(51) Int. Cl.
B62D 29/04       (2006.01)
B60R 13/08       (2006.01)
B62D 25/08       (2006.01)

(52) U.S. Cl.
CPC .......... B60R 13/0823 (2013.01); B62D 25/08
(2013.01); B62D 29/04 (2013.01)

(58) Field of Classification Search
CPC .................................................. B60R 13/0823
See application file for complete search history.

(56) References Cited

U.S. PATENT DOCUMENTS

| | | | | |
|---|---|---|---|---|
| 4,938,518 | A | * | 7/1990 | Willemsen .......... B60R 13/0823 |
| | | | | 296/24.41 |
| 6,102,470 | A | * | 8/2000 | Heim ................... B62D 25/087 |
| | | | | 293/133 |
| 12,280,680 | B2 | * | 4/2025 | An ......................... B62D 25/20 |
| 12,344,318 | B2 | * | 7/2025 | Lee ........................ B62D 25/08 |
| 2022/0355747 | A1 | * | 11/2022 | Yoon ...................... B60R 13/08 |
| 2024/0092426 | A1 | * | 3/2024 | Park ...................... B62D 27/065 |

* cited by examiner

*Primary Examiner* — Aaron L Lembo
(74) *Attorney, Agent, or Firm* — Lempia Summerfield
Katz LLC

(57) ABSTRACT

A rear vehicle body structure includes a cabin portion made
of Carbon Fiber Reinforced Plastic (CFRP) material, and a
rear partition panel mounted to the rear of the cabin portion.

13 Claims, 6 Drawing Sheets

REAR VEHICLE BODY STRUCTURE

CROSS-REFERENCE TO RELATED APPLICATION

This application claims priority to and the benefit of Korean Patent Application No. 10-2022-0101956, filed in the Korean Intellectual Property Office on Aug. 16, 2022, the entire contents of which are incorporated herein by reference.

BACKGROUND

(a) Field

The present disclosure relates to a rear vehicle body structure. More particularly, the present disclosure relates to a rear vehicle body structure for securing the strength and crash performance of the vehicle body.

(b) Description of the Related Art

Carbon Fiber Reinforced Plastic (CFRP) is a composite material that uses carbon fiber as a reinforcing material and a thermosetting resin or thermoplastic resin as a matrix.

Because CFRP is relatively light and has high strength, its use in car body manufacturing is increasing.

The CFRP body structure can be made lighter than steel bodies, and as a high-strength material, mold costs can be reduced when the number of vehicles produced is small.

In particular, the CFRP body structure is a structure that remains intact even under high external impacts due to its high yield strength, providing protection to passengers. In the case of a vehicle body structure with a battery positioned at the bottom, it is possible to prevent damage of the battery.

The above information disclosed in this Background section is provided only to enhance understanding of the background of the present disclosure, and therefore it may contain information that does not form the prior art that is already known to a person of ordinary skill in the art.

SUMMARY

The present disclosure has been made in an effort to provide a rear vehicle body structure capable of improving vehicle body performance by diversifying load transmission paths and securing strength.

According to an embodiment of the present disclosure, a rear vehicle body structure may include a cabin portion made of CFRP material, and a rear partition panel mounted to the rear of the cabin portion.

The rear partition panel may include vertical columns protruded to form rear closed sections.

The rear partition panel may further include: a partition cross panel portion protruded in the width direction of the vehicle body, a cabin portion support panel portion connected to the lower portion of the partition cross panel portion and formed to support the rear of the cabin portion, and a partition extension panel portion bent from the cabin portion support panel portion and extended to the rear of the vehicle body. In particular, the vertical column may extend from the partition extension panel portion along the cabin portion support panel portion and may be connected to the partition cross panel portion.

The rear vehicle body structure according to an embodiment of the present disclosure may further include a rear module mounting panel mounted on a lower portion of the rear partition panel, on which a rear side member is mounted.

The rear module mounting panel may include a module mounting rear mount part protruded to mount the rear side member thereon.

The rear module mounting panel may further include a module mounting connection protruded portion protruded from the module mounting rear mount part and extended in a forward upper direction of the vehicle body.

The module mounting connection protruded portion may include a module mounting outer connection protruded part extending in an outer direction of the vehicle body, and a module mounting inner connection protruded part extending in an inner direction of the vehicle body.

The module mounting inner connection protruded part may be formed toward the vertical column.

The rear module mounting panel may further include a module mounting upper connection portion connected to the partition extension panel portion.

The module mounting upper connection portion and the module mounting connection protruded portion may form a lower closed section.

The rear vehicle body structure according to an embodiment of the present disclosure may further include a cross member mounted between the rear module mounting panel and the cabin portion.

The rear vehicle body structure according to an embodiment of the present disclosure may further include a cross member bracket connected to the cross member to support the rear module mounting panel.

The rear vehicle body structure according to an embodiment of the present disclosure may further include an upper body mounted on the cabin portion and formed with a rear glass, and a rear partition upper side panel mounted on both sides of the rear glass.

The rear partition upper side panel may include an upper side inner protrusion protruding toward the vertical column, and an upper side outer protrusion protruding outward from the vehicle body.

The rear vehicle body structure according to an embodiment of the present disclosure may further include a rear module mounting panel mounted on a lower portion of the rear partition, of which a module mounting rear mount part protruded to mount the rear side member is formed thereon, and of which a module mounting connection protruded portion protruded from the module mounting rear mount part and extended in a forward upper direction of the vehicle body is formed thereon.

According to the rear vehicle body structure according to an embodiment of the present disclosure, the performance of the vehicle body can be improved by diversifying the load transmission path and securing strength.

In addition, the effects that can be obtained or predicted due to the embodiments of the present disclosure will be directly or implicitly disclosed in the detailed description of the embodiments of the present disclosure. That is, various effects expected according to an embodiment of the present disclosure will be disclosed within the detailed description to be described later.

BRIEF DESCRIPTION OF THE DRAWINGS

Since these drawings are for reference in explaining embodiments of the present disclosure, the technical idea of the present disclosure should not be construed as being limited to the accompanying drawings.

DETAILED DESCRIPTION

Figure 1:
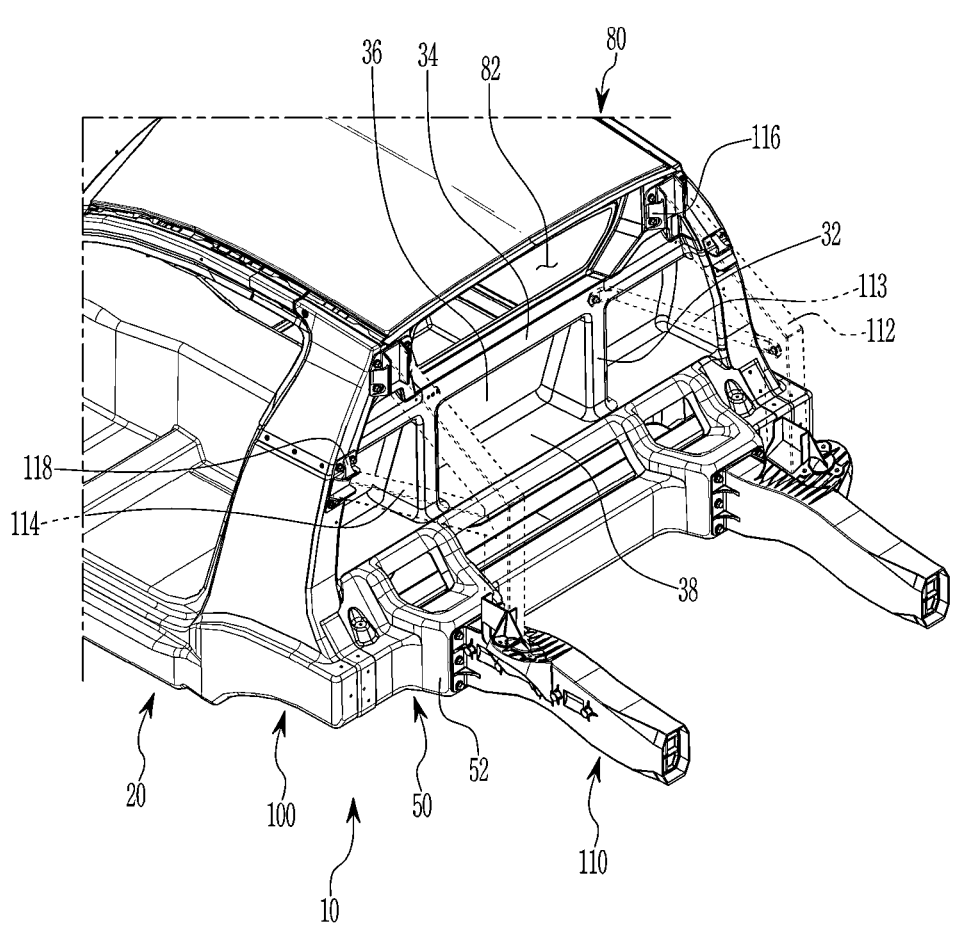
FIG. 1 is a perspective view of a rear vehicle body structure according to an embodiment of the present disclosure.

The present disclosure is described more fully hereinafter with reference to the accompanying drawings, in which some embodiments of the present disclosure are shown.

As those having ordinary skill in the art would realize, the described embodiments may be modified in various different ways, all without departing from the spirit or scope of the present disclosure.

In order to clearly describe the present disclosure, parts irrelevant to the description are omitted, and the same reference numerals are assigned to the same or similar components throughout the specification.

Since the size and thickness of each component shown in the drawings are arbitrarily shown for convenience of description, the present disclosure is not necessarily limited to those shown in the drawings, and the thickness is enlarged to clearly express various parts and regions.

In the following detailed description, the names of the components are divided into first, second, etc. to classify them based on the relationship between the components, and the order is not necessarily limited in the following description.

Throughout the specification, when a part includes a certain component, this means that it may further include other components without excluding other components unless otherwise stated. When a component, device, element, or the like of the present disclosure is described as having a purpose or performing an operation, function, or the like, the component, device, or element should be considered herein as being "configured to" meet that purpose or to perform that operation or function.

In addition, terms such as a portion, a part, a unit, . . . means described in the specification mean a comprehensive unit of configuration that performs at least one function or operation.

When a part such as a layer, film, region, plate, etc. is said to be "on" another part, this includes not only the case directly on the other part, but also the case where there is another part in between.

In contrast, when an element is referred to as being "directly on" another element, there are no intervening elements present.

Embodiments of the present disclosure are hereinafter described in detail with reference to the accompanying drawings.

Figure 2:
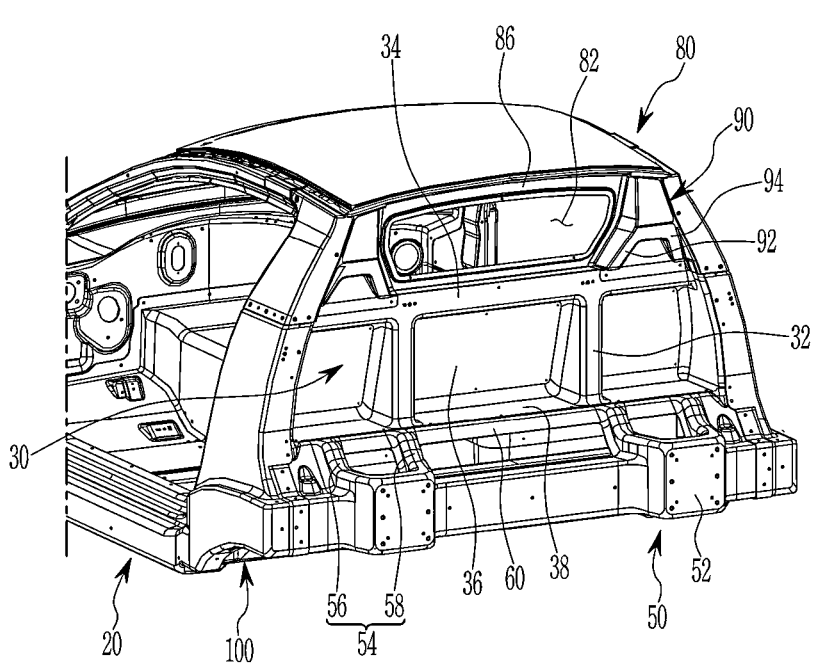
FIG. 2 is a partial perspective view of the rear vehicle body structure according to an embodiment of the present disclosure.

FIG. 1 is a perspective view of a rear vehicle body structure according to an embodiment of the present disclosure, and FIG. 2 is a partial perspective view of the rear vehicle body structure according to an embodiment of the present disclosure.

Referring to FIG. 1 and FIG. 2, a rear vehicle body structure according to an embodiment of the present disclosure may include a cabin portion 20 made of CFRP material, and a rear partition panel 30 mounted to the rear of the cabin portion 20.

Since the CFRP material is relatively light and has high strength, it can be applied to the cabin portion 20 to more safely protect passengers.

In the detailed description and claim, a configuration referred to as a closed section (closed portion) can be defined as having formed at least a portion of space distinct from the outside.

Figure 6:
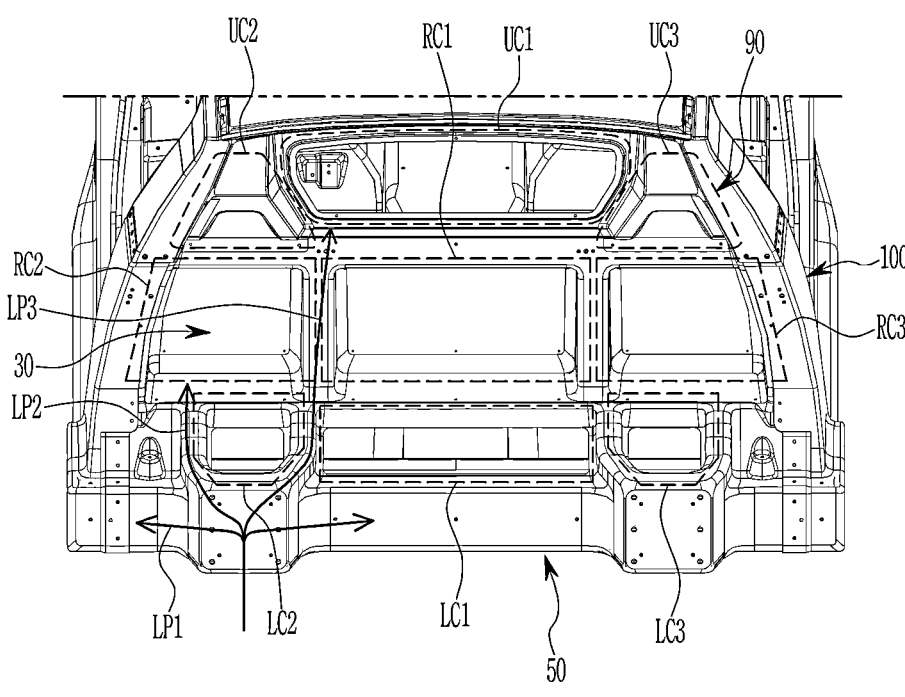
FIG. 6 is a rear view of a rear vehicle body structure according to an embodiment of the present disclosure.

FIG. 6 is a rear view of a rear vehicle body structure according to an embodiment of the present disclosure.

Referring to FIG. 1, FIG. 2 and FIG. 6, a rear closed section may be formed in the rear partition panel 30, and as shown in the drawing, a plurality of the rear closed sections RC1, RC2, and RC3 may be formed.

However, the rear closed section RC1, RC2, and RC3 are not limited to the three configurations shown in the drawing, and may be formed in an appropriate number for load distribution depending on the type and size of the vehicle.

The rear partition panel 30 may include vertical columns 32 protrude to form the rear closed sections RC1, RC2, and RC3.

As shown in the drawing, the vertical columns 32 may be formed in pairs, side by side, in the vertical direction on the rear partition panel 30, but is not limited thereto, and the vertical columns 32 may be formed in appropriate numbers to effectively distribute the load of the vehicle body 10 in the vertical direction.

The rear partition panel 30 may further include a partition cross panel portion 34 protruded in the width direction of the vehicle body 10, a cabin portion support panel portion 36 connected to the lower portion of the partition cross panel portion 34 and formed to support the rear of the cabin portion 20, and a partition extension panel portion 38 bent from the cabin portion support panel portion 36 and extended to the rear of the vehicle body 10.

The partition cross panel portion 34 may distribute the load in the width direction of the vehicle body 10, and the cabin portion support panel portion 36 has a relatively wide area and may widely distribute the load to the cabin portion 20.

The partition extension panel portion 38 may distribute the load in the width direction of the vehicle body 10 and may be connected to a rear module mounting panel 50 described below.

The vertical column 32 may extend from the partition extension panel portion 38 along the cabin portion support panel portion 36 and be connected to the partition cross panel portion 34.

The vertical column 32 connects the partition extension panel portion 38 and the cabin portion support panel portion 36 to form the rear closed section RC1, RC2, and RC3. Accordingly, the strength of the vehicle body 10 is increased and the impact load may be distributed to the front of the vehicle body 10.

Figure 3:
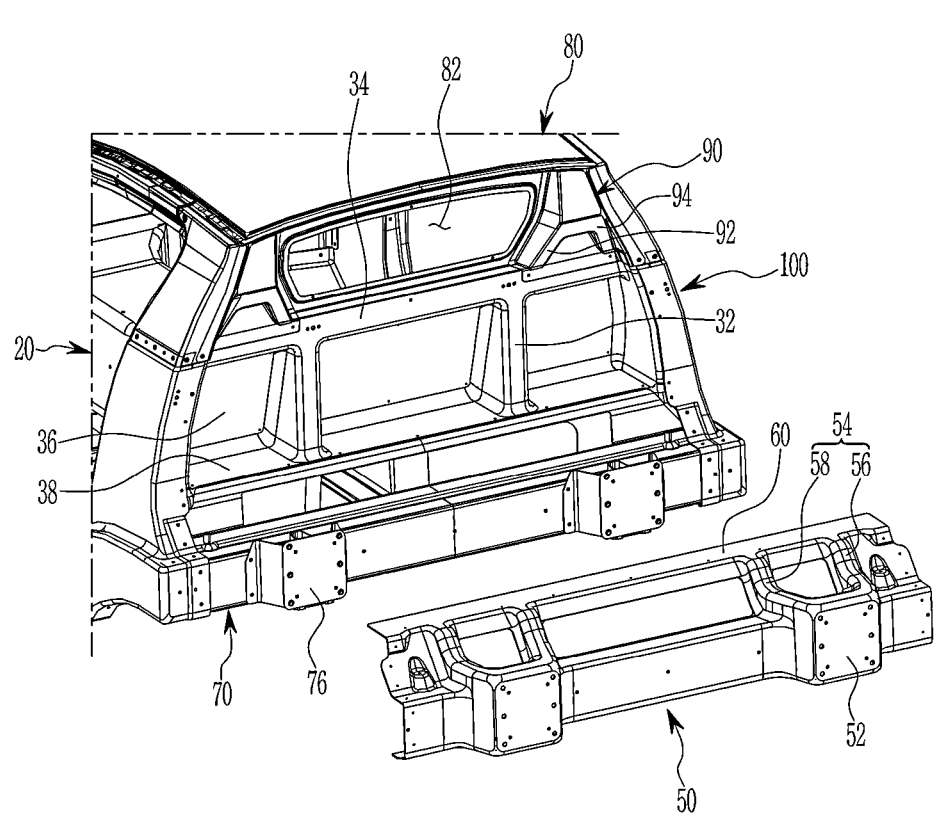
FIG. 3 and FIG. 4 are partially exploded perspective views of a lower part of the rear vehicle body structure according to embodiments of the present disclosure.
Figure 4:
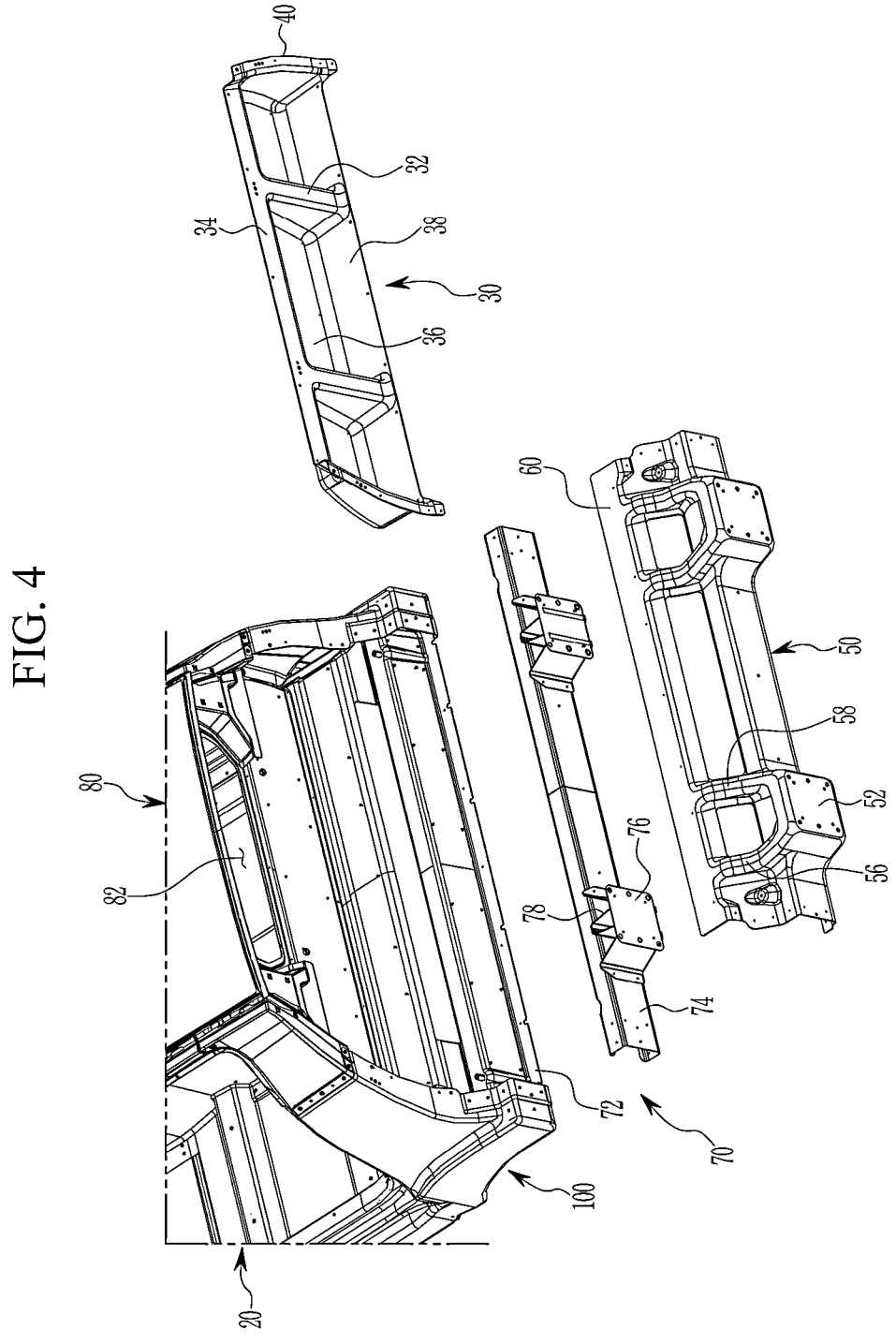

FIG. 3 and FIG. 4 are partially exploded perspective views of a lower part of the rear vehicle body structure according to an embodiment of the present disclosure.

Referring to FIG. 1 to FIG. 4, the rear vehicle body structure may further include a rear module mounting panel 50 mounted on a lower portion of the rear partition panel 30, on which a rear side member 110 is mounted.

The rear module mounting panel 50 may include a module mounting rear mount part 52 protruded to mount the rear side member 110 thereon.

The rear side member 110 may be made of, for example, a relatively lightweight aluminum material.

The rear side member 110 can absorb impact while being partially deformed when a vehicle collides and distributes a part of the impact load to the cabin portion 20 through the module mounting rear mount part 52.

The rear module mounting panel 50 may further include a module mounting connection protruded portion 54 protruded from the module mounting rear mount part 52 and extended in a forward upper direction of the vehicle body 10.

The module mounting connection protruded portion 54 may include a module mounting outer connection protruded part 56 extending in an outer direction of the vehicle body 10 and a module mounting inner connection protruded part 58 extending in an inner direction of the vehicle body 10.

The module mounting inner connection protruded part 58 may be formed toward the vertical column 32.

The rear module mounting panel 50 may further include a module mounting upper connection portion 60 connected to the partition extension panel portion 38.

When a vehicle collides, the module mounting upper connection portion 60 may distribute a portion of the collision load to the cabin portion 20 through the partition extension panel portion 38.

The module mounting upper connection portion 60 and the module mounting connection protruded portion 54 may form a lower closed section.

Referring to FIG. 3 and FIG. 6, the module mounting outer connection protruded part 56 and the module mounting inner connection protruded part 58 of the module mounting connection protruded portion 54 connected to the module mounting rear mount part 52 and the module mounting upper connection portion 60 may form the lower closed sections LC1, LC2, and LC3.

The drawing shows that three lower closed sections LC1, LC2, and LC3 are formed, but is not limited thereto, an appropriate number of lower closed sections may be formed depending on the size and type of the vehicle.

The lower closed sections LC1, LC2, and LC3 enhance the strength of the vehicle by the bending shape and its connection shape, and may distribute the crash load transmitted from the rear of the vehicle to the front of the vehicle in the event of a vehicle collision.

The rear vehicle body structure according to an embodiment of the present disclosure may further include a cross member 70 mounted between the rear module mounting panel 50 and the cabin portion 20.

The rear vehicle body structure may further include a cross member bracket 76 connected to the cross member 70 to support the rear module mounting panel 50.

The cross member 70 may include a cross inner member 72 supporting the cabin portion 20 and a cross outer member 74 connected to the cross inner member 72 and supporting the rear module mounting panel 50.

The cross member bracket 76 is protruded from the cross outer member 74 to support the module mounting rear mount part 52.

A bracket support 78 is mounted between the cross member bracket 76 and the cross outer member 74 to absorb the impact load transmitted from the module mounting rear mount part 52.

The vehicle body 10 may include B pillars 100 mounted on both sides of the rear of the cabin portion 20, and the cross member 70 is mounted between the B pillars 100. In the event of a vehicle collision, the impact load transmitted from the rear may be distributed to the cabin portion 20 and the B pillar 100.

A rear partition pillar flange 40 for connection with the B pillar 100 may be formed at both ends of the rear partition panel 30.

Figure 5:
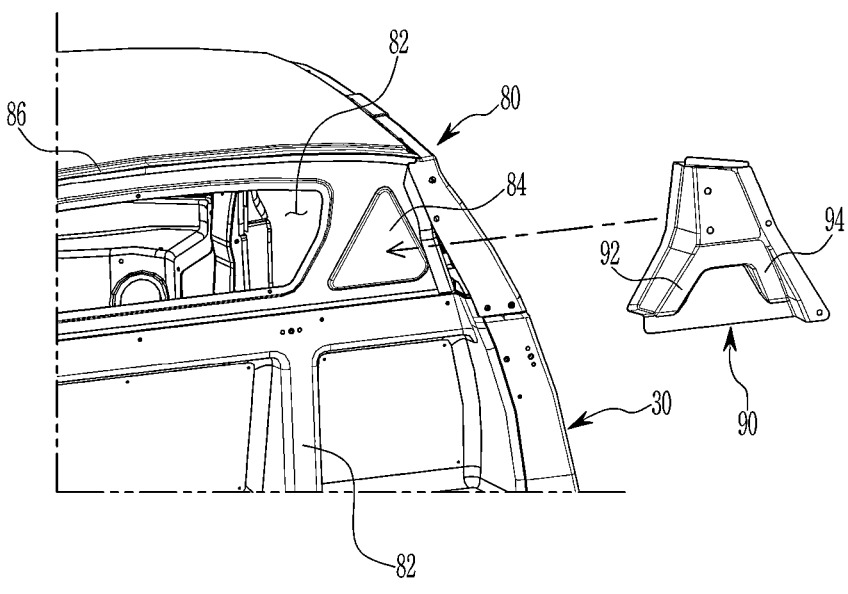
FIG. 5 is a partially exploded perspective view of an upper part of the rear vehicle body structure according to an embodiment of the present disclosure.

FIG. 5 is a partially exploded perspective view of an upper part of the rear vehicle body structure according to an embodiment of the present disclosure.

Referring to FIG. 1 to FIG. 3 and FIG. 5, the rear vehicle body structure further includes an upper body 80 mounted on the cabin portion 20 and formed with a rear glass 82, and a rear partition upper side panel 90 mounted on both sides of the rear glass 82.

The upper body 80 is connected to the cabin portion 20, and an economical steel material having relatively strong strength may be applied to the upper body 80 so that the occupant can be protected while minimizing the cost increase of the vehicle.

The rear partition upper side panel 90 may include an upper side inner protrusion 92 protruding toward the vertical column 32 and an upper side outer protrusion 94 protruding outward from the vehicle body 10.

The upper side inner protrusion 92 may reinforce the periphery of the rear glass 82 and may distribute the impact load transmitted from the vertical column 32 to the upper body 80.

The upper side outer protrusion 94 together with the upper side inner protrusion 92 supports the upper body 80 in a roughly triangular protrude configuration, and may distribute the impact load transmitted from the B pillar 100 to the upper body 80.

In addition, the upper side outer protrusion 94 may increase the connection strength between the upper body 80 and the B pillar 100.

The upper body 80 may include an upper body panel connection portion 84 to which the rear partition upper side panel 90 is mounted. For example, the upper body panel connection portion is protruded to enhance rigidity, and the rear partition upper side panel 90 may be easily mounted.

Also, the upper body 80 may include an upper body roof portion 86 formed in the width direction of the vehicle body 10.

Referring to FIG. 1, the rear side member 110 may include a rear upper supporting member 112 connected to the upper body 80, a rear central supporting member 113 connected to the upper portion of the vertical column 32, and a rear side supporting member 114 connected to the B pillar 100.

A rear upper supporting member bracket 116 is mounted on the rear partition upper side panel 90, and the rear upper supporting member 112 may be connected to the rear partition upper side panel 90 through the rear upper supporting member bracket 116.

A rear side supporting member bracket 118 is mounted on the B pillar 100, and the rear side supporting member 114 may be connected to the B pillar 100 through the rear side supporting member bracket 118.

The rear partition upper side panel 90 mounted on the upper body 80 forms upper closed sections UC1, UC2, and UC3 shown in FIG. 6 together with the upper body roof portion 86, and the impact load may be distributed.

In other words, when a rear collision of the vehicle occurs, the main crash load is transmitted through the module mounting rear mount part 52, and the width direction load LP1, which is part of the crash load in the module mounting rear mount part 52, may be distributed to the cabin portion 20 and the B pillar 100 through the rear module mounting panel 50 and the cross member 70.

In addition, the longitudinal direction load LP2, which is part of the impact load transmitted through the module mounting rear mount part 52, may be distributed to the cabin sure is not limited to the disclosed embodiments. On the contrary, it is intended to cover various modifications and equivalent arrangements included within the spirit and scope of the present disclosure.

<Description of symbols>

| | |
|---|---|
| 10: vehicle body | 20: cabin portion |
| 22: cabin rear panel | 24: cabin rear cross panel |
| 30: rear partition panel | 32: vertical column |
| 34: partition cross panel portion | |
| 36: cabin portion support panel portion | |
| 38: partition extension panel portion | 40: rear partition pillar flange |
| 50: rear module mounting panel | |
| 52: module mounting rear mount part | |
| 54: module mounting connection protruded portion | |
| 56: module mounting outer connection protruded part | |
| 58: module mounting inner connection protrude part | |
| 60: module mounting upper connection portion | |
| 70: cross member | 72: cross inner member |
| 74: cross outer member | 76: cross member bracket |
| 78: bracket support | 80: upper body |
| 82: rear glass | |
| 84: upper body panel connection portion | |
| 86: upper body roof portion | |
| 90: rear partition upper side panel | |
| 92: upper side inner protrusion | 94: upper side outer protrusion |
| 100: B pillar | 110: rear side member |
| 112: rear upper supporting member | |
| 113: rear central supporting member | |
| 114: rear side supporting member | |
| 116: rear upper supporting member bracket | |
| 118: rear side supporting member bracket | |
| RC1, RC2, RC3: rear closed section | |
| LC1, LC2, LC3: lower closed section | |
| UC1, UC2, UC3: upper closed section | | portion 20 and the upper body 80 through the module mounting connection protruded portion 54 and the rear partition panel 30.

In other words, a part of the crash load may be distributed to the rear partition panel 30 and the cabin portion 20 through the module mounting outer connection protruded part 56, and a part of the other crash load may be distributed to the cabin portion 20 and the upper body 80 through the module mounting inner connection protruded part 58 and the vertical column 32.

The rear module mounting panel 50 and the rear partition panel 30 form the lower closed sections LC1, LC2, and LC3 to disperse the crash load to reduce occupant injuries.

The rear partition panel 30 may reduce injury to the occupant by dispersing the collision load transmitted through the partition extension panel portion 38 through the vertical column 32, the cabin portion support panel portion 36 and the partition cross panel portion 34.

In other words, the rear partition panel 30 forms the rear closed sections RC1, RC2, and RC3 to absorb and disperse collisions.

The rear partition upper side panel 90 may reduce injury to the occupant by distributing the collision load transmitted through the vertical column 32, the B pillar 100 and the rear upper supporting member 112 to the cabin portion 20 and the upper body 80.

As described above, the rear vehicle body structure according to an embodiment of the present disclosure may absorb and disperse collisions by forming various collision dispersion routes, thereby reducing injuries to occupants.

While the present disclosure has been described in connection with what is presently considered to be practical embodiments, it is to be understood that the present disclo-

What is claimed is:

1. A rear vehicle body structure comprising:
   a cabin portion made of Carbon Fiber Reinforced Plastic (CFRP) material; and
   a rear partition panel mounted to a rear of the cabin portion, wherein the rear partition panel comprises vertical columns protruded to form rear closed sections,
   wherein the rear partition panel further comprises:
      a partition cross panel portion protruded in a width direction of the vehicle body;
      a cabin portion support panel portion connected to a lower portion of the partition cross panel portion and formed to support the rear of the cabin portion; and
      a partition extension panel portion configured to be bent from the cabin portion support panel portion and extended to the rear of the vehicle body, and
   wherein the vertical column is configured to extend from the partition extension panel portion along the cabin portion support panel portion and is connected to the partition cross panel portion.

2. The rear vehicle body structure of claim 1, further comprises
   a rear module mounting panel mounted on a lower portion of the rear partition panel, on which a rear side member is mounted.

3. The rear vehicle body structure of claim 2, wherein the rear module mounting panel comprises
   a module mounting rear mount part protruded to mount the rear side member thereon.

4. The rear vehicle body structure of claim 3, wherein the rear module mounting panel further comprises
   a module mounting connection protruded portion protruded from the module mounting rear mount part and extended in a forward upper direction of the vehicle body.

5. The rear vehicle body structure of claim 4, wherein the module mounting connection protruded portion comprises:

a module mounting outer connection protruded part extending in an outer direction of the vehicle body; and a module mounting inner connection protruded part extending in an inner direction of the vehicle body.

6. The rear vehicle body structure of claim 5, wherein the module mounting inner connection protruded part is formed toward the vertical column.

7. The rear vehicle body structure of claim 4, wherein the rear module mounting panel further comprises a module mounting upper connection portion connected to the partition extension panel portion.

8. The rear vehicle body structure of claim 7, wherein the module mounting upper connection portion and the module mounting connection protruded portion form a lower closed section.

9. The rear vehicle body structure of claim 2, further comprising a cross member mounted between the rear module mounting panel and the cabin portion.

10. The rear vehicle body structure of claim 9, further comprising a cross member bracket connected to the cross member to support the rear module mounting panel.

11. A rear vehicle body structure comprising:

a cabin portion made of Carbon Fiber Reinforced Plastic (CFRP) material:

a rear partition panel mounted to a rear of the cabin portion, wherein the rear partition panel includes vertical columns protruded to form rear closed sections;

an upper body mounted on the cabin portion and formed with a rear glass; and a rear partition upper side panel mounted on both sides of the rear glass;

wherein the rear partition panel further comprises:

a partition cross panel portion protruded in a width direction of the vehicle body;

a cabin portion support panel portion connected to a lower portion of the partition cross panel portion and formed to support the rear of the cabin portion; and a partition extension panel portion configured to be bent from the cabin portion support panel portion and extended to the rear of the vehicle body, and wherein the vertical column is configured to extend from the partition extension panel portion along the cabin portion support panel portion and is connected to the partition cross panel portion.

12. The rear vehicle body structure of claim 11, wherein the rear partition upper side panel comprises:

an upper side inner protrusion protruding toward the vertical column; and an upper side outer protrusion protruding outward from the vehicle body.

13. The rear vehicle body structure of claim 12, further comprising a rear module mounting panel mounted on a lower portion of the rear partition, of which a module mounting rear mount part protruded to mount a rear side member is formed thereon, and of which a module mounting connection protruded portion protruded from the module mounting rear mount part and extended in a forward upper direction of the vehicle body is formed thereon.

* * * * *